(12) United States Patent
Lemoff et al.

(10) Patent No.: US 10,095,051 B2
(45) Date of Patent: Oct. 9, 2018

(54) OXYGEN PERMEABLE CONTACT LENS STRUCTURES WITH THICK PAYLOADS

(71) Applicant: Spy Eye, LLC, Los Gatos, CA (US)

(72) Inventors: Brian Elliot Lemoff, Morgan Hill, CA (US); Michael West Wiemer, San Jose, CA (US)

(73) Assignee: Spy Eye, LLC, Palo Alto, CA (US)

( * ) Notice: Subject to any disclaimer, the term of this patent is extended or adjusted under 35 U.S.C. 154(b) by 0 days.

(21) Appl. No.: 15/885,079

(22) Filed: Jan. 31, 2018

(65) Prior Publication Data

US 2018/0224671 A1 Aug. 9, 2018

Related U.S. Application Data

(60) Provisional application No. 62/509,543, filed on May 22, 2017, provisional application No. 62/454,607, filed on Feb. 3, 2017.

(51) Int. Cl.
*G02C 7/04* (2006.01)
*B29D 11/00* (2006.01)

(52) U.S. Cl.
CPC ............ *G02C 7/049* (2013.01); *G02C 7/047* (2013.01); *B29D 11/00076* (2013.01); *B29D 11/00817* (2013.01); *G02C 2202/16* (2013.01)

(58) Field of Classification Search
CPC .... G02C 7/049; G02C 7/047; G02C 2202/16; G02C 7/04; G02C 7/041; G02C 7/042; G02C 7/081; G02C 7/083; G02C 7/10; G02C 7/101; G02C 2202/12; G02C 2202/14; B29D 11/00076; B29D 11/00817

USPC .................................................. 351/159.03
See application file for complete search history.

(56) References Cited

U.S. PATENT DOCUMENTS

| | | |
|---|---|---|
| 4,486,577 A | 12/1984 | Mueller et al. |
| 4,594,401 A | 6/1986 | Takahashi et al. |
| 4,954,587 A | 9/1990 | Mueller |
| 5,548,352 A | 8/1996 | Dewey |
| 8,153,726 B2 | 4/2012 | Hoffman |

(Continued)

OTHER PUBLICATIONS

PCT International Search Report and Written Opinion, PCT Application No. PCT/US2018/016419, dated Apr. 4, 2018, 11 pages.
(Continued)

*Primary Examiner* — William R Alexander
*Assistant Examiner* — Henry Duong
(74) *Attorney, Agent, or Firm* — Fenwick & West LLP

(57) ABSTRACT

A contact lens structure provides adequate corneal oxygenation while accommodating a relatively thick core with electronic devices. In one approach, an oxygen collection stratum, such as a gas-permeable outer layer coupled with an underlying air gap, collects oxygen from the ambient air. On the cornea-side, an oxygen distribution stratum, such as a gas-permeable inner layer coupled with an overlying air gap, provides distribution of oxygen to the cornea. The two strata are connected via a network of oxygen pathways, such as air shafts through the relatively impermeable core. Thus, the oxygen collection stratum collects oxygen over a portion of the outer surface of the contact lens, which is transmitted through most of the thickness of the contact lens via the oxygen pathways to the oxygen distribution stratum, where the oxygen is distributed to the cornea of the wearer.

20 Claims, 14 Drawing Sheets

(56) References Cited

U.S. PATENT DOCUMENTS

| | | |
|---|---|---|
| 8,786,675 B2 | 7/2014 | Deering |
| 8,911,078 B2 | 12/2014 | Meyers |
| 9,039,171 B2 | 5/2015 | Groisman |
| 9,063,352 B2 | 6/2015 | Ford et al. |
| 9,341,864 B2 | 5/2016 | de Juan, Jr. et al. |
| 9,389,434 B2 | 7/2016 | Jubin et al. |
| 9,442,307 B2 | 9/2016 | Meyers |
| 2006/0290882 A1 | 12/2006 | Meyers et al. |
| 2010/0001926 A1 | 1/2010 | Amirparviz et al. |
| 2010/0118262 A1 | 5/2010 | Rosenthal |
| 2015/0312560 A1 | 10/2015 | Deering et al. |
| 2016/0054589 A1* | 2/2016 | Otts .................. A61L 31/06 351/159.03 |
| 2016/0266406 A1 | 9/2016 | Meyers et al. |
| 2016/0379054 A1 | 12/2016 | Sicari et al. |
| 2017/0299892 A1 | 10/2017 | Pugh et al. |

OTHER PUBLICATIONS

Holden, B.A. et al., "Critical Oxygen Levels to Avoid Corneal Edema for Daily and Extended Wear Contact Lenses," Investigative Ophthalmology and Visual Science, Oct. 1984, pp. 1161-1167, vol. 25, No. 10.

Harvitt, D.M. et al., "Re-Evaluation of the Oxygen Diffusion Model for Predicting Minimum Contact Lens Dk/t Values Needed to Avoid Corneal Anoxia," Optometry and Vision Science, 1999, pp. 712-719, vol. 76, No. 10.

Holden, B.A. et al., "Critical Oxygen Levels to Avoid Corneal Edema for Daily and Extended Wear Contact Lenses," Investigative Ophthalmology & Visual Science, Oct. 1984, pp. 1161-1167, vol. 25.

* cited by examiner

OXYGEN PERMEABLE CONTACT LENS STRUCTURES WITH THICK PAYLOADS

CROSS-REFERENCE TO RELATED APPLICATION(S)

This application claims priority under 35 U.S.C. § 119(e) to U.S. Provisional Patent Application Ser. No. 62/454,607, titled "Oxygen Permeable Contact Lens Structures for Thick Payloads," filed on Feb. 3, 2017; and to U.S. Provisional Patent Application Ser. No. 62/509,543, titled "Oxygen Permeable Contact Lens Structures for Thick Payloads," filed on May 22, 2017, the subject matters of which are both incorporated herein by reference in their entireties.

BACKGROUND

1. Technical Field

This disclosure generally relates to contact lens structures and in particular to oxygen permeable contact lens structures that can carry payloads of active devices.

2. Description of Related Art

Contact lenses that provide refractive vision correction are ubiquitous. In addition, therapeutic lenses may be used to treat eye diseases and injuries. For example, scleral contact lenses, which are supported at the periphery of the eye, may be used to treat cornea disorders and severe dry eye syndrome, in addition to providing refractive vision correction.

Due to the lack of blood vessels within the human cornea, the tissue that makes up the cornea receives oxygen through exposure to the air. As such, in order to maintain corneal health, any contact lens disposed over the cornea requires at least a threshold amount of oxygen permeability to allow for sufficient oxygenation of the cornea.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

Figure 1:
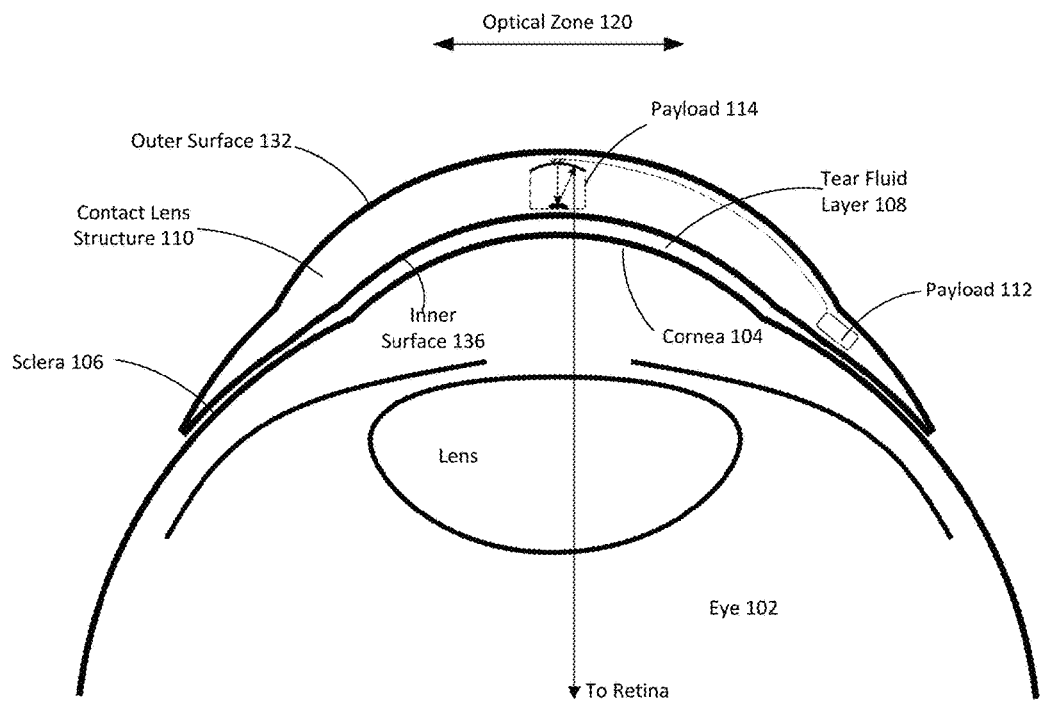
FIG. 1 shows a cross sectional view of a scleral contact lens structure mounted on an eye.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Different types of contact lens structures may be used to perform different functions. In some cases, the contact lens structure may contain active devices, which will be referred to as active payloads. For example, an active contact lens structure may contain a sensor device for monitoring glucose concentration in tear fluid or for measuring intraocular pressure. As another example, a very small projector(s) and/or camera(s) may be contained in the contact lens structure. For example, a contact lens display comprises a contact lens structure containing a projector, such as a "femtoprojector" as described by Deering in U.S. Pat. No. 8,786,675, "Systems using eye mounted displays," incorporated herein by reference. The projector may project images onto the wearer's retina, thus superimposing virtual objects onto the field of view of the wearer. Thus, when a person is wearing the contact lens display, he may see an augmented reality. Other active payloads may include other electronic, optical or micro-electromechanical devices.

In order to embed a payload within a contact lens structure, the contact lens structure must be thick enough to accommodate the payload and also provide sufficient mechanical support for the payload. However, increasing the thickness reduces the oxygen transmission to the cornea. In addition, relatively impermeable materials may be used to provide mechanical support for the payload, thus further reducing oxygen transmission to the cornea. Insufficient oxygenation of the cornea may lead to eye discomfort and therefore be intolerable to the wearer.

To avoid this, in one approach, a contact lens structure with a relatively impermeable core containing the payload(s) may still adequately oxygenate the cornea by providing a structure to collect oxygen from the air, a structure to distribute the oxygen over the cornea, and a pathway between the two structures through or around the core. These structures typically are thin layers in order to prevent the overall contact lens from becoming too thick. The first structure, also referred to as an oxygen collection stratum, may be an outer layer of the contact lens that is gas-permeable and exposed to ambient oxygen, coupled with an air gap between the outer layer and the core to provide for lateral oxygen movement. The cornea-facing structure, also referred to as an oxygen distribution stratum, may be an inner layer of the contact lens that is gas-permeable and disposed over the cornea (usually, with an intervening layer of tear fluid), coupled with an air gap that provides lateral distribution of oxygen across the cornea. The pathways between the two strata can take different forms. In one approach, they are a network of oxygen channels between the two strata, for example holes through the impermeable core.

Oxygen is transported from the ambient environment to the cornea as follows. The gas-permeable outer layer of the contact lens exposes a surface through which oxygen can be collected, with the underlying air gap transporting the oxygen to the network of oxygen pathways. The oxygen pathways transport the oxygen through most of the thickness of the lens. The air gap on the cornea-side of the pathways transports the oxygen to the gas-permeable inner layer of the contact lens, through which the oxygen reaches the cornea.

Because there are two air gaps, one on the collection side between the outer contact lens layer and the core and one on the distribution side between the core and the inner contact lens layer, these contact lens structures are sometimes referred to as "dual-gap contact lens structures." In some cases, rather than air gaps, other layers that facilitate the collection or distribution of oxygen may be used. For convenience, these will also be referred to as "dual-gap" structures even though they may not have physical air gaps. Examples of dual-gap contact lens structures are described below.

FIG. 1 shows a cross sectional view of a scleral contact lens structure mounted on an eye. The eye 102 includes a cornea 104 and a sclera 106. The contact lens structure 110 is designed to contact the sclera. 106 and to form a tear fluid layer 108 over the cornea 104. The tear fluid layer may have a thickness of approximately about 10 um to about 200 um over the cornea. Oxygen permeates through the contact lens structure 110 and tear fluid layer 108 to the cornea 104, at a rate depending upon the geometry of the contact lens structure 110 and the oxygen transmissibility properties and thickness of the materials that form the contact lens structure 110.

The contact lens structure 110 contains payload(s) that may include active electronics. The active payloads may include active electronics 114 located within the optical zone 120 of the contact lens structure 110, as well as active electronics 112 located outside the optical zone. As an example, the payloads may include a femtoprojector 114 that projects images onto the wearer's retina and corresponding electronics 112 to operate the femtoprojector. Other payloads may include passive devices, such as a coil-antenna for wireless power or data transmission.

The optical zone 120 of the contact lens 110 is the portion through which light passes en route to the retina. This may be light from the external world that is imaged by the eye onto the retina. It may also be light created by the femtoprojector 114 which is projected onto the retina. For example, the portion of the contact lens structure 110 that rests on the sclera 106 is outside the optical zone, and the wearer's view of the outside world is not affected if that part of the lens is opaque or light-blocking. On the other hand, the center portion of the contact lens 110 is within the optical zone. The diameter of the optical zone 120 is typically 2-8 mm. In addition, the optical zone 120 is smaller than the cornea 104. As such, portions of the contact lens structure 110 that are outside the optical zone 120 may still overlap the cornea 104.

The contact lens structure 110 has an outer surface 132 and an inner surface 136. As used herein, terms such as "outer" "over" "top" "up" and "anterior" refer to the direction away from the wearer's eye, while "inner" "under" "bottom" "down" and "posterior" refer to the direction towards the wearer's eye.

A conventional contact lens structure 110 may be constructed from a rigid gas permeable material having an oxygen permeability of approximately $$Dk \cong 100 \times 10^{-11} \left(\frac{cm^2}{sec}\right)\left(\frac{ml_{O_2}}{ml}\right)\left(\frac{1}{mmHg}\right),$$

commonly quoted as Dk="100", wherein D corresponds to a diffusion constant measured in $$\left(\frac{cm^2}{sec}\right),$$

and k corresponds to a concentration of $O_2$ per unit of $O_2$ partial pressure, and is measured in $$\left(\frac{ml_{O_2}}{ml}\right)\left(\frac{1}{mmHg}\right).$$

As such, a 200 um thickness of this material has oxygen transmissibility $$Dk/t \cong 50 \times 10^{-9} \left(\frac{cm}{sec}\right)\left(\frac{ml_{O_2}}{ml}\right)\left(\frac{1}{mmHg}\right),$$

commonly quoted as Dk/t="50", wherein t corresponds to a thickness of the material. Generally, an oxygen transmissibility of Dk/t="24" is the minimum recommended for daily wear contact lenses, while an oxygen transmissibility of Dk/t="87" is the minimum recommended for extended wear lenses in contact with the cornea. See, e.g., Holden and Mertz, Investigative Ophthalmology and Visual Science 25:1161-1167, 1984. Dk can be measured in Barrers, where $$1 \text{ Barrer} = 10^{-10} \frac{cm^3_{STP} \cdot cm}{cm^2 \cdot sec \cdot cmHg} =$$

$$10^{-11} \frac{cm^3_{STP} \cdot cm}{cm^2 \cdot sec \cdot mmHg} = 10^{-11} \left(\frac{cm^3_{STP}}{cm^3}\right)\left(\frac{cm^2}{sec}\right)\left(\frac{1}{mmHg}\right),$$

and $cm_{STP}^3$ refers to a number of gas molecules that would occupy a space of 1 cubic centimeter (1 cc) at STP (standard temperature and pressure), as calculated using the ideal gas law.

In addition, because scleral lenses such as the contact lens structure 110 illustrated in FIG. 1 create a tear pocket 108 between the contact lens structure 110 and the cornea 104, the oxygen transmissibility (Dk/t) of the tear pocket 108 must also be considered. As such, a conventional rigid gas permeable scleral lens with a thickness greater than a few hundred microns typically will not satisfy oxygen transmission requirements. Due to these oxygen transmission requirements, conventional scleral contact lens structures typically cannot accommodate payloads of 500 to 1000 um or more in thickness. However, many active payloads require this greater thickness.

Figure 2A:
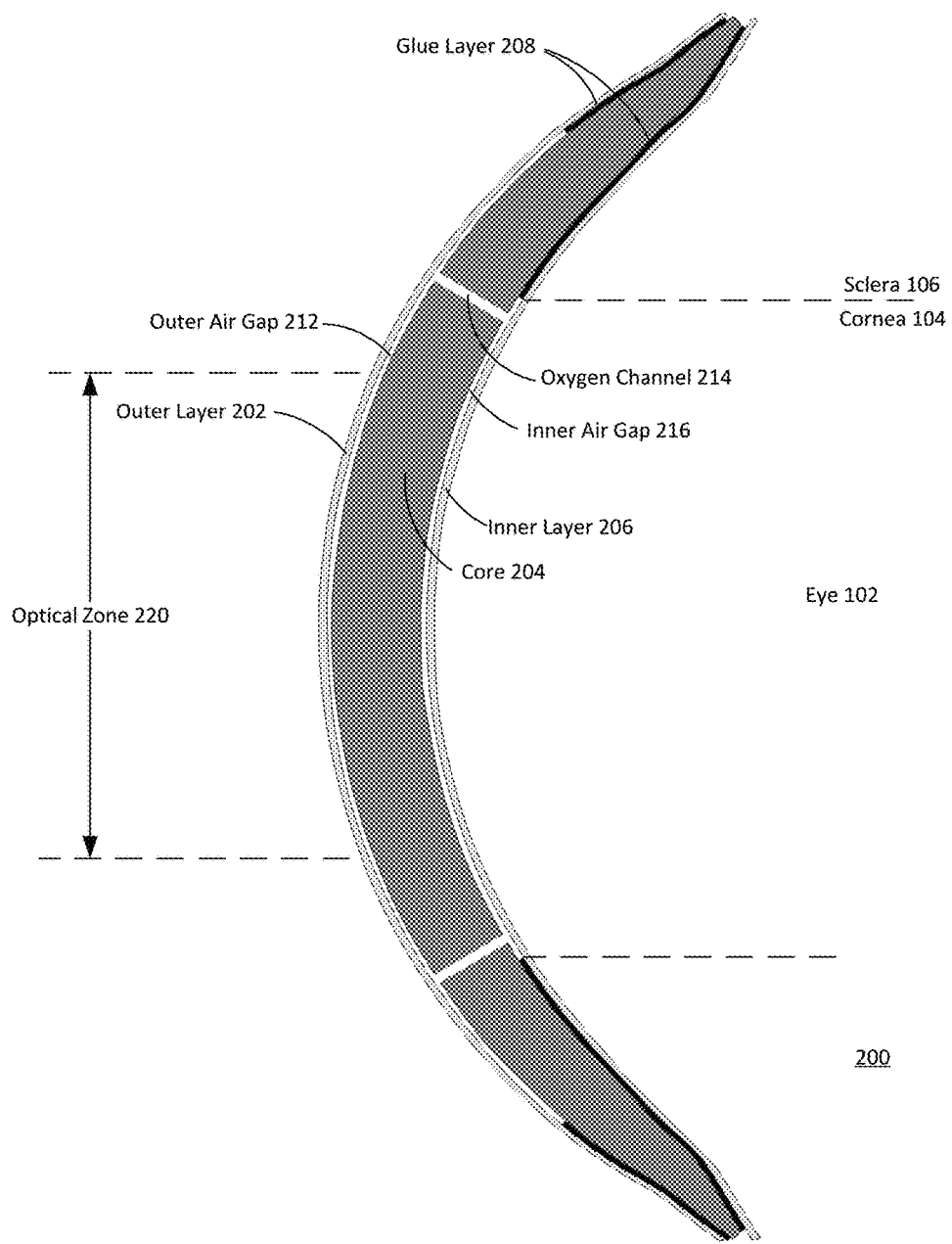
FIG. 2A is a cross sectional view of a dual-gap contact lens structure able to accommodate a thick payload.

FIG. 2A is a cross sectional view of a dual-gap contact lens structure 200 able to accommodate a thick payload (e.g., greater than 500 um thick). This lens structure 200 is a scleral contact lens with an outer layer 202, a middle layer or core 204, and an inner layer 206. When the lens is worn, the inner layer 206 contacts a tear fluid layer on the eye and the outer layer 202 is exposed to air (except when the wearer closes their eye or blinks). For reference, the locations of the eye 102, cornea 104 and sclera 106 are shown, although the actual structures are not drawn in FIG. 2A. The outer layer 202 and inner layer 206 are relatively thin and are made of materials that are permeable to oxygen such as rigid gas permeable ("RGP") plastic. The core 204 is sufficiently thick to accommodate the payloads. It may also be made from an oxygen permeable material such as RGP or from an oxygen impermeable material such as poly(methyl methacrylate) ("PMMA"). Other oxygen permeable materials may be substituted for RGP and other oxygen permeable or non-permeable materials may be substituted for PMMA. In some embodiments, the core 204 does not contain a payload, but has a thickness such that a conventional scleral lens having the thickness and material of the core 204 would have insufficient oxygen transmission.

The outer layer 202, core 204, and inner layer 206 are bonded to each other via glue layers 208 near the periphery of the contact lens structure 200, outside the optical zone 220. Suitable glues for the glue layers 208 include medical grade optical cement. Example glues that may be appropriate for this application include optical adhesives from Norland Products, Cranbury, N.J.

Within the optical zone and out to the radius of the glue layers 208, the outer layer 202 is separated from the core 204 by an outer air gap 212. In addition, the inner layer 206 is separated from the core 204 by an inner air gap 216. In some embodiments, the glue layer 208 bonding the inner layer 206 to the core 204 is outside the cornea 104, such that the inner air gap 216 laterally overlaps with substantially all of the wearer's cornea 104. The outer air gap 212 and/or the inner air gap 216 may contain spacers (not shown) used to maintain gap distance and overall structural integrity of the contact lens structure. The core 204 may have an antireflection coating on either or both of its surfaces in order to reduce optical reflections at the interface between the core 204 and the outer and inner air gaps 212/216.

The outer air gap 212 and inner air gap 216 are connected via oxygen channels 214, some of which travel through the core 204. The channels 214 may be holes formed in the core 204. They serve as passageways for oxygen from the outer air gap 212 to reach the inner air gap 216. In some embodiments, the channels 214 are oriented substantially vertically and pass through the entire thickness of the core 204. The channels 214 may be drilled through the core 204 or may be formed as part of a molding process for forming the core. The channels 214 may each have a substantially uniform cross-section (e.g., circular cross-section), for example with diameters ranging from about 5 um to about 0.5 mm.

Because the outer layer 202 is exposed to air, oxygen is able to diffuse from the surrounding air through the oxygen permeable material of the outer layer 202 to the outer air gap 212. The oxygen collected in the outer air gap 212 diffuses rapidly through the oxygen channels 214 to the inner air gap 216, where it may diffuse through the oxygen permeable material of the inner layer 206 to reach the tear fluid layer and underlying cornea of the wearer. If the inner air gap 216 covers a large portion of the wearer's cornea, oxygen may be fairly evenly distributed across the wearer's cornea through the inner layer 206.

Because they function together to collect oxygen from the surrounding air, the outer layer 202 and outer air gap 212 may be collectively referred to as the "oxygen collection stratum." In addition, the inner layer 206 and inner air gap 216 may be collectively referred to as the "oxygen distribution stratum." Because the outer air gap 212 is beneath the outer layer 202, the outer gap 212 may be referred to as a "collection underlayer" of the stratum. Similarly, because the inner air gap 216 is above the inner layer 206, the inner air gap 216 may be referred to as a "distribution overlayer" of the stratum.

Because oxygen diffusion through the air (such as the air in the gaps 212/216 and the shafts 214) is roughly 100,000 times more rapid than diffusion through permeable solids such as RGP, the oxygen transmissibility of the contact lens structure 200 is defined primarily by the thicknesses of the outer layer 202 and inner layer 206, and not by thickness of the air gaps 212/216 or the core 204. For example, consider a lens in which the collection underlayer and distribution overlayer have equal areas. If each of the outer layer 202 and inner layer 206 of contact lens structure 200 has a thickness of 100 um, and is made of an RGP material having "Dk"=100, then the total "Dk/t" of the entire lens structure 200 will be approximately 50. In other words, "Dk/t" of the entire lens structure 200 is substantially similar to the "Dk/t" for a 200 um thick layer of RGP material. The thicknesses of air gaps 212/216, diameters of channels 214, and number of channels 214 in the contact lens structure 200 are selected to ensure that the Dk/t of the entire lens structure is sufficient to provide a desired level of cornea oxygenation. In addition, the thickness and structural strength of the core 204 may be chosen to accommodate a payload.

In some embodiments, the outer and inner layers of a contact lens structure 200 each have a thickness of approximately 100 um. In cases, the outer and inner layers may each be between about 10 um and about 300 um in thickness. In some embodiments, the upper air gap and lower air gap are each less than 100 um in thickness (e.g., about 75 um thick). However, in other cases, the air gaps may be as thick as up to 300 um, or as thin as about 0.1 um or less. The core 204 of the contact lens structure 200 is sized to be capable of carrying a payload, such as an active payload, if desired, and may be as thick as about 1 mm or more, about 0.5 mm or more, and typically is at least 0.1 mm thick.

As such, the contact lens structure 200 may have a total thickness of about 1.35 mm (1 mm core, 100 μm for each of the upper and lower layers, and 75 μm for each of the upper and lower air gaps) or more. This is thicker than can be achieved with a conventional scleral contact lens, but has shown to still be a comfortable thickness for most wearers.

Figure 2B:
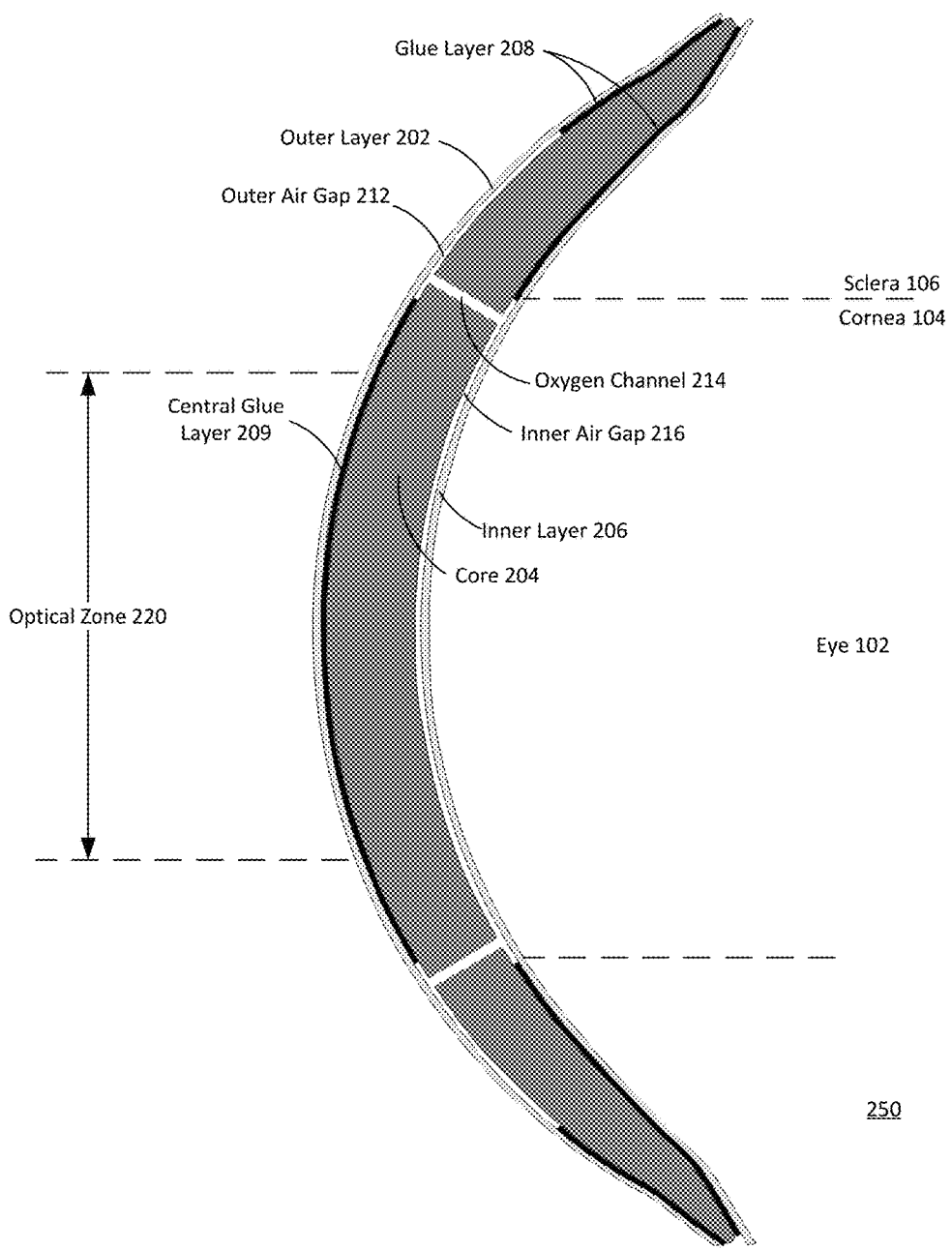
FIG. 2B is a cross sectional view of another dual-gap contact lens structure able to accommodate a thick payload.

FIG. 2B is a cross sectional view of another dual-gap contact lens structure. The contact lens structure 250 illustrated in FIG. 2B is similar to the contact lens structure 200 illustrated in FIG. 2A. However, the outer layer 202 of the contact lens structure 250 is, within the optical zone 220, bonded to the core 204 by a central glue layer 209, instead of being separated from the core 204 by an air gap. The glue within the central glue layer 209 is optically transparent, and may be index matched to reduce optical reflections at the boundary between the outer layer 202 and the central glue layer 209, and at the boundary between the central glue layer 209 and the core 204. In addition, the central glue layer 209 may serve as structural support for the outer layer 202, potentially reducing the number of spacers in the outer air gap 212.

The outer air gap 212 separates the outer layer 202 from the core 204 outside the optical zone 220, in the area between the central glue layer 209 and the glue layers 208 near the periphery of the lens. On the other hand, the inner layer 206 remains separated from the core 204 by the inner air gap 216 within the diameter of the cornea, in order to facilitate even distribution of oxygen to the wearer's cornea through the inner layer 204. As illustrated in FIG. 2B, the inner air gap 216 and outer air gap 212 overlap outside the optical zone 220 and the channels 214 are also located outside the optical zone 220. The channels 214 allow for flow of oxygen between the outer and inner air gaps through the core 204.

Figure 3:
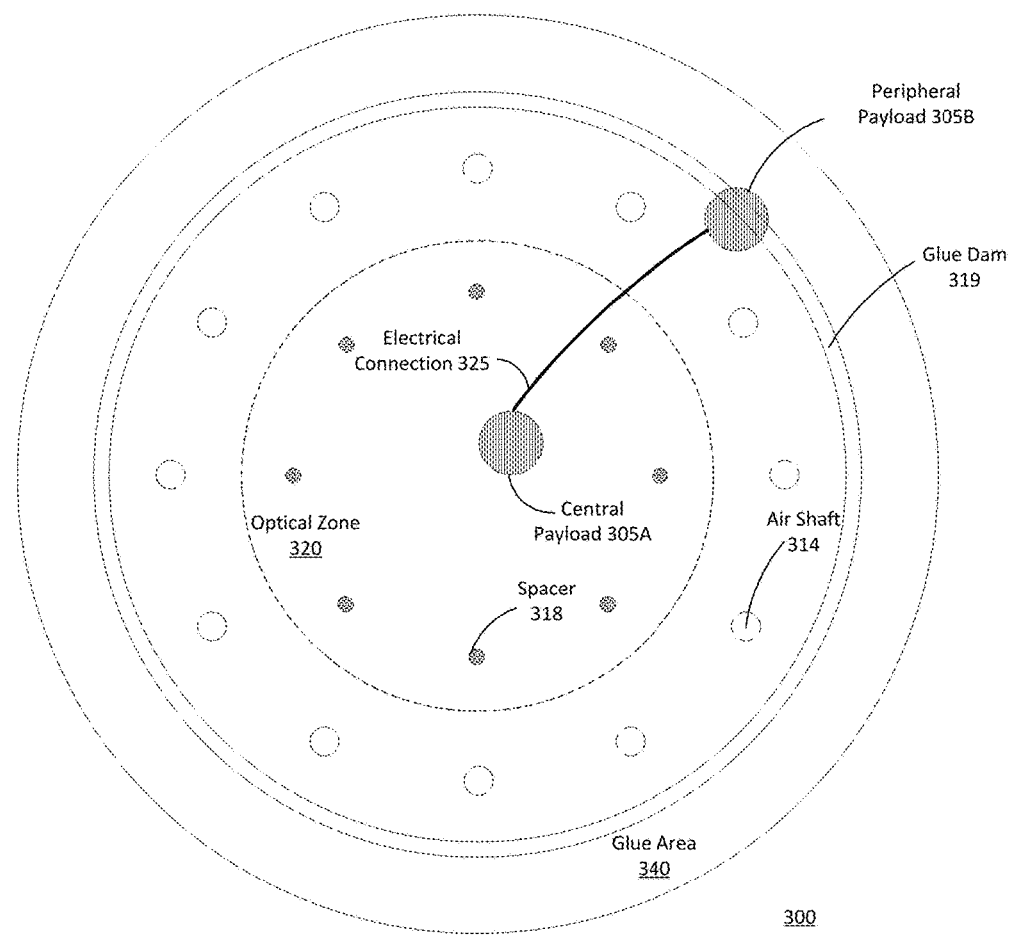
FIG. 3 is a plan view of a dual-gap contact lens structure.

FIG. 3 is a top-down plan view of a dual-gap contact lens structure. The contact lens structure 300 illustrated in FIG. 3 is similar to the contact lens structures 200 illustrated in FIGS. 2A and 2B. The core of the contact lens structure 300 carries a central payload 305A located within the optical zone 320, which is marked by the dashed line. The central payload 305A may be near the center of the contact lens structure 300 or in other locations of the core within the optical zone 320. Because most active payloads that contain electrical components are not transparent to light, these types of payloads may be located within the optical zone 320 only if necessary. For example, the central payload 305A may be a femtoprojector that projects images onto the retina of the wearer's eye, thus necessitating that the central payload 305A be located within the optical zone 320.

The core may carry more than one payload. For example, the contact lens structure 300 may carry a second payload 305B such as a controller chip and/or a power coil in an area of the contact lens structure outside the optical zone 320. The peripheral payload 305B is connected to the central payload 305A within the optical zone 320 via an electrical connection 325.

Air shafts 314 are holes through the core of the contact lens structure 300. While FIG. 3 illustrates twelve air shafts 314 with circular cross-sections evenly distributed across the core outside the optical zone 320, the actual number of air shafts, as well as their respective shapes, diameters, and locations, is a matter of engineering choice in a particular lens structure design.

Spacers 318 may be placed within the upper and/or lower air gaps to maintain gap dimensions and overall structural integrity of the contact lens structure 300. As illustrated in FIG. 3, the spacers 318 may be located within the optical zone 320 within the lower air gap or the upper air gap (if the upper air gap extends to within the optical zone, e.g., as illustrated in FIG. 2A). Alternatively, some or all of the spacers 318 may be located outside the optical zone 320. The spacers 318 may be plastic micro balls, cylindrical or rectangular posts, or any other type of structural component. The spacers 318 may be made of a transparent material. In other embodiments, because the spacers 318 occupy only a small fraction of the area of the optical zone 320, they are made of a non-transparent material without significantly affecting the visibility of the wearer.

The contact lens structure 300 also includes a glue dam 319 that separates the optical zone 320 from a peripheral glue area 340 where the layers of the contact lens structure 300 are glued together. The glue dam 319 is a solid structure between layers of the contact lens structure 300 that restricts the flow of glue within the glue area 340 during lens manufacture, preventing the glue from entering the central portion of the contact lens structure 300 outside the glue area 340.

Figure 4A:
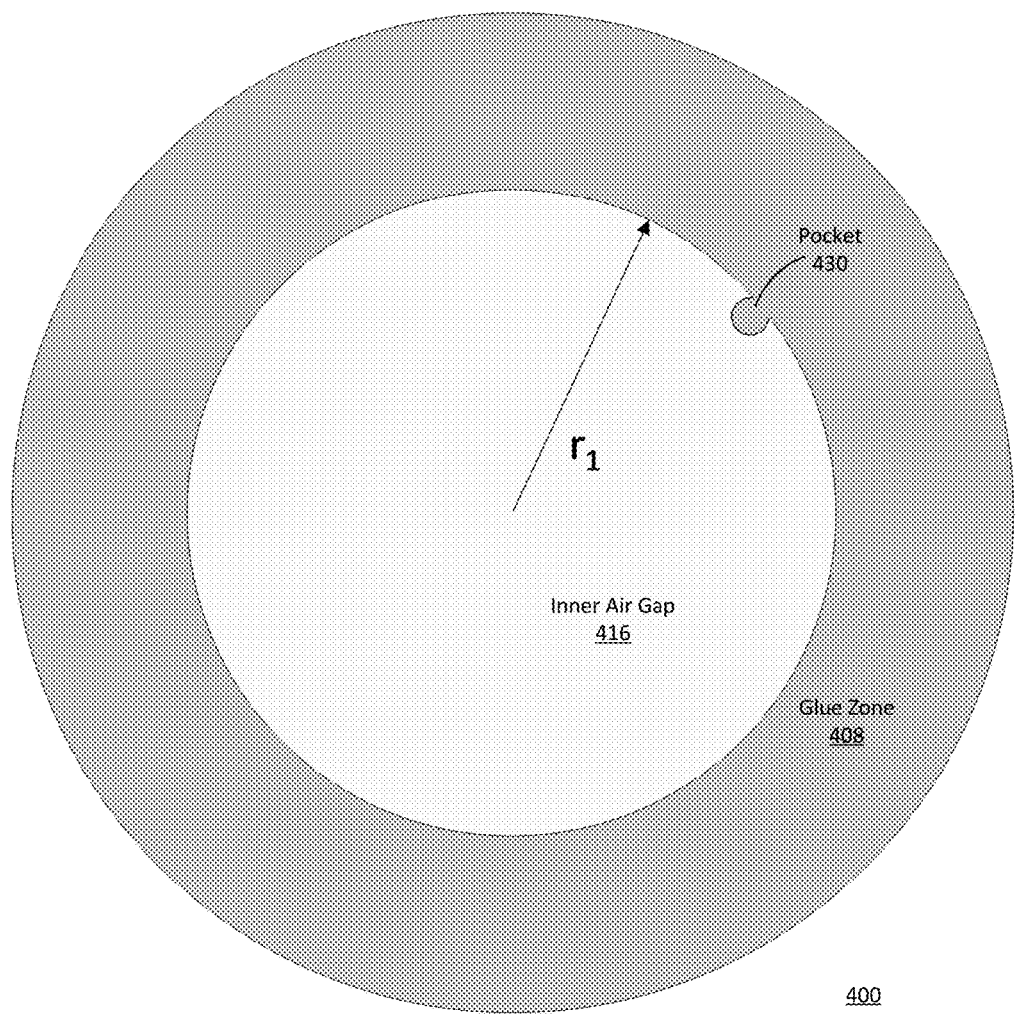
FIGS. 4A and 4B are plan views that illustrate the lateral extent of an inner air gap and outer air gap of a dual-gap contact lens structure, respectively.
Figure 4B:
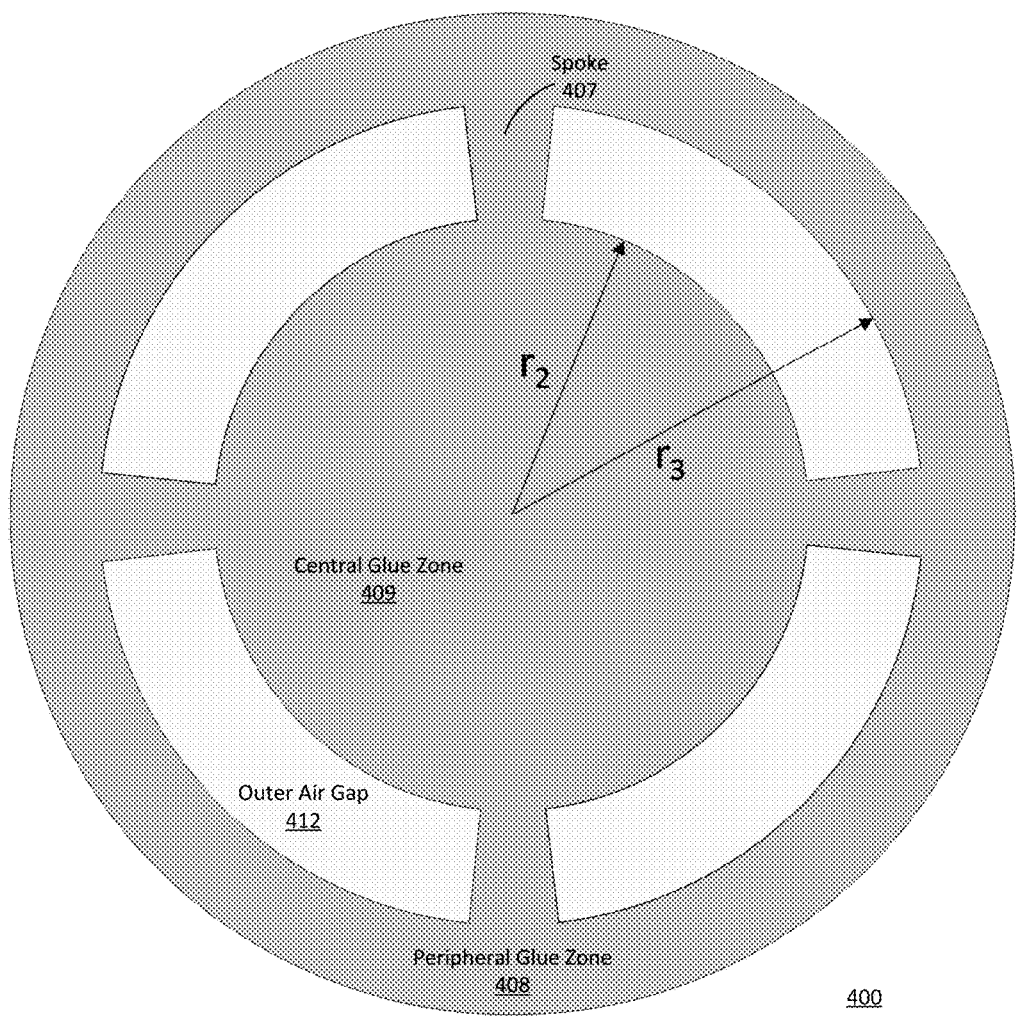

FIGS. 4A and 4B are plan views showing the inner and outer air gaps of a dual-gap contact lens structure, respectively. This contact lens structure is similar to the contact lens structure of FIG. 2B, in that the outer air gap 412 remains outside the optical zone. In FIG. 4A, the inner air gap 416 extends from the center of the contact lens structure 400 out to a radius, $r_1$, which is large enough to encompass the entire cornea of the wearer. A glue zone 408 extends from the radius $r_1$ to the peripheral edge of the contact lens structure 400. In some embodiments, the glue zone 408 includes a glue dam (not shown) or other solid structures to prevent liquid glue from entering the inner air gap during manufacture and assembly.

The inner air gap 416 need not be circular. For example, as illustrated in FIG. 4A, the glue zone 408 may extend into the air gap 416 in a small pocket 430. The pocket 430 may correspond to a location for an optional through hole or fenestration in the contact lens structure 400, or other type of structure within the contact lens structure.

In FIG. 4B, the outer air gap 412 extends from a first smaller radius, $r_2$, to a second larger radius, $r_3$, measured from the center of the contact lens structure 400. The radius $r_2$ may correspond to a radius of the optical zone, while the radius $r_3$ corresponds to a radius of the peripheral glue zone 408 that bonds the upper layer to the core of the contact lens structure 400. In addition, the core and upper layers of the contact lens structure 400 are bonded together at a central glue zone 409 within the optical zone. As such, the outer air gap 408 may be substantially annular or ring-shaped.

In the example of FIG. 4B, the peripheral glue zone 408 and the central glue zone 409 are connected via one or more spokes 407, creating discontinuities in the annular outer air gap 408 (e.g., dividing the outer air gap 408 into disjoint sections). The spokes 407 may provide additional structural support to the outer layer and core of the contact lens structure 400, and may reduce or eliminate the need for spacers within the outer air gap 412. The glue of the central glue zone 409 may be different from the glue of the peripheral glue zone 408. For example, the glue of the central glue zone 409 is optically transparent, while the glue of the peripheral glue zone 408 need not be optically transparent. As another variation, the contact lens structure may not contain a central glue zone (e.g., similar to the contact lens structure 200 of FIG. 2A), such that the outer air gap is substantially circular instead of annular.

In the example of FIGS. 4A and 4B, the inner air gap has a lateral area of about $\pi r_1^2$, while the outer air gap has an area of about $\pi(r_3^2 - r_2^2)$, discounting any pockets, spokes, or other deviations. Often, the area of the inner air gap is designed to be large enough to cover the entire cornea. The effective transmissibility, Dk/t, of the contact lens structure over the cornea depends on the thicknesses and lateral areas of the outer and inner layers that are adjacent to air gaps. Increasing the lateral area of the outer layer with underlying air gap increases the effective area which is exposed to ambient oxygen. The dimensions of the inner and outer air gaps (e.g., $r_1$, $r_2$, $r_3$) can be selected independently from the design of the core, and do not affect the core of the contact lens structure.

Figure 5A:
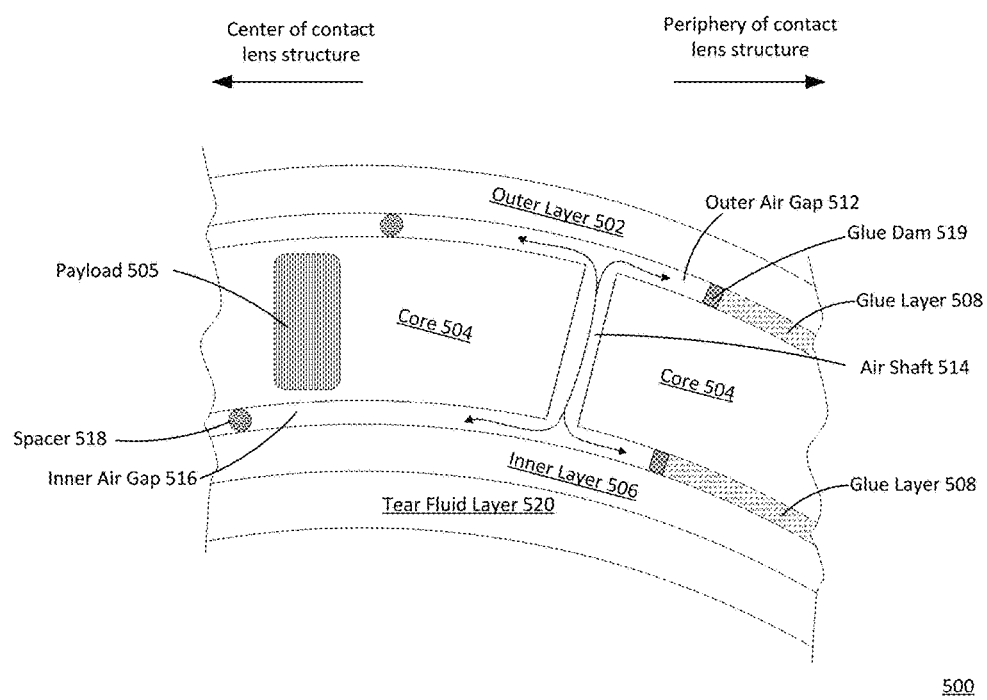
FIG. 5A is a close-up cross sectional view of a dual-gap contact lens structure.

FIG. 5A is a close-up cross sectional view of a dual-gap contact lens structure. The contract lens structure 500 has an outer layer 502, a core 504, and an inner layer 506. When the lens is worn on a wearer's eyeball, the inner layer 506 is in contact with a tear fluid layer 520 on the surface of the eye. The outer layer 502 is exposed to ambient oxygen. The core 504 contains a payload 505, which may contain active electronics such as a femtoprojector.

The outer layer 502 is separated from the core 504 by an outer air gap 512, which extends from the center of the contact lens structure 500 to the glue dam 519 and glue layer 508. Similarly, the inner layer 506 is separated from the core 504 by the inner air gap 516, which also extends to the glue dam 519 and glue layer 508. Spacers 518 are placed in the outer and inner air gaps to maintain gap distance and overall structural integrity. The outer air gap 512 and inner air gap 516 are connected by air shafts 514 that run vertically through the core 504. Although illustrated as two different areas in FIG. 5A, the different areas of the core 504 may be part of a single piece of material that contains the air shafts 514 but is otherwise continuous. In some embodiments, the outer layer 502 and/or the inner layer 506 may be directly adjacent to the core 504, but with a matrix of grooves formed at the interface. Air is able to flow within the space formed by grooves at the interface between the core 504 and the outer layer 502 and/or inner layer 506, and through the air shafts 514.

Oxygen diffuses freely in the air gaps 512/516 and between air gaps via the air shafts 514. Oxygen diffuses slowly from surrounding air through the outer layer 502 to be collected in the outer air gap 512. From the outer air gap 512, the oxygen diffuses through the air shaft 514 to the inner air gap 516, and then through the gas-permeable inner layer 506 to the tear fluid layer 520 and underlying cornea. Because the rate of oxygen diffusion in the air gaps and shafts is much greater than in the oxygen permeable inner and outer layers, the overall oxygen transmissibility (Dk/t) of the contact lens structure is defined primarily by the thickness of and the area covered by the outer and inner layers, and not by the thickness of the air gaps, or the dimensions of the air shafts or the core 504. Thus the core 504 can be designed to accommodate the payload 505.

Figure 5B:
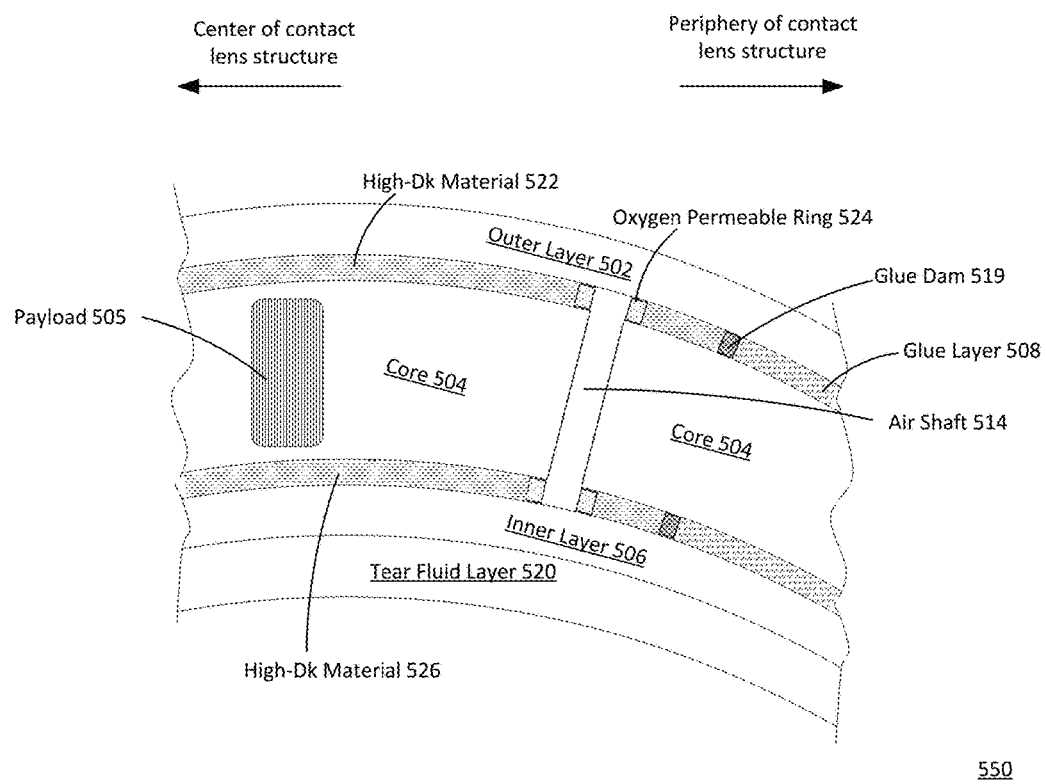
FIG. 5B is a close-up cross sectional view of a dual-gap contact lens structure that uses high-Dk material rather than air gaps.

FIG. 5B is a close-up cross sectional view of another dual-gap contact lens structure. The contact lens structure 550 illustrated in FIG. 5B is similar to the contact lens structure 500 of FIG. 5A, except that highly oxygen permeable, solid materials 522/526 are used in place of the air gaps 512/516. Examples of high-Dk solid materials include polyacetylenes, such as poly(trimethylsilylpropyne), poly(tetramethyldisilabutylpropyne), poly(p-t-butylphenylpentyne), poly(propylpentyne), poly(methylpentyne), poly(dimethylsiloxane) and similar compounds. Some of these materials are as much as fifty times more permeable to oxygen than conventional RGP materials.

In the contact lens structure 550, the air shafts 514 are surrounded by oxygen permeable rings 524, which isolate the high-Dk material 522/526 from the air shafts 514 (analogous to the glue dam 519 with regards to the glue layer 508). The ring 524 may be made from RGP or another oxygen permeable material, allowing oxygen to diffuse from the high-Dk material 522/526 to the air shafts 514. Using high-Dk material 522/526 instead of air gaps may permit optical index matching with the outer layer 502, core 504, and inner layer 506 of the contact lens structure 550. The high-Dk material 522/526 may also provide additional structural support for the outer and inner layers. When high-Dk material is used, gap thicknesses, air shaft diameters and number of air shafts may be adjusted to achieve a desired Dk/t for the entire contact lens structure.

In some embodiments, the high-Dk material may fill only certain portions of the air gaps 512 and 516. For example, the high-Dk material may fill only those portions of the upper air gap 512 within the optical zone (e.g., similar to the central glue layer 209 illustrated in FIG. 2B) to achieve optical index matching.

In FIG. 5B, a high-Dk layer, rather than an air gap, provides lateral diffusion of oxygen. High-Dk layer 522 provides lateral diffusion of oxygen collected by the outer layer 502, and may be referred to as a collection underlayer (since it is beneath the outer layer 502. Similarly, high-Dk layer 526 provides lateral distribution of oxygen to the inner layer 506, and may be referred to as a distribution overlayer.

Figure 6:
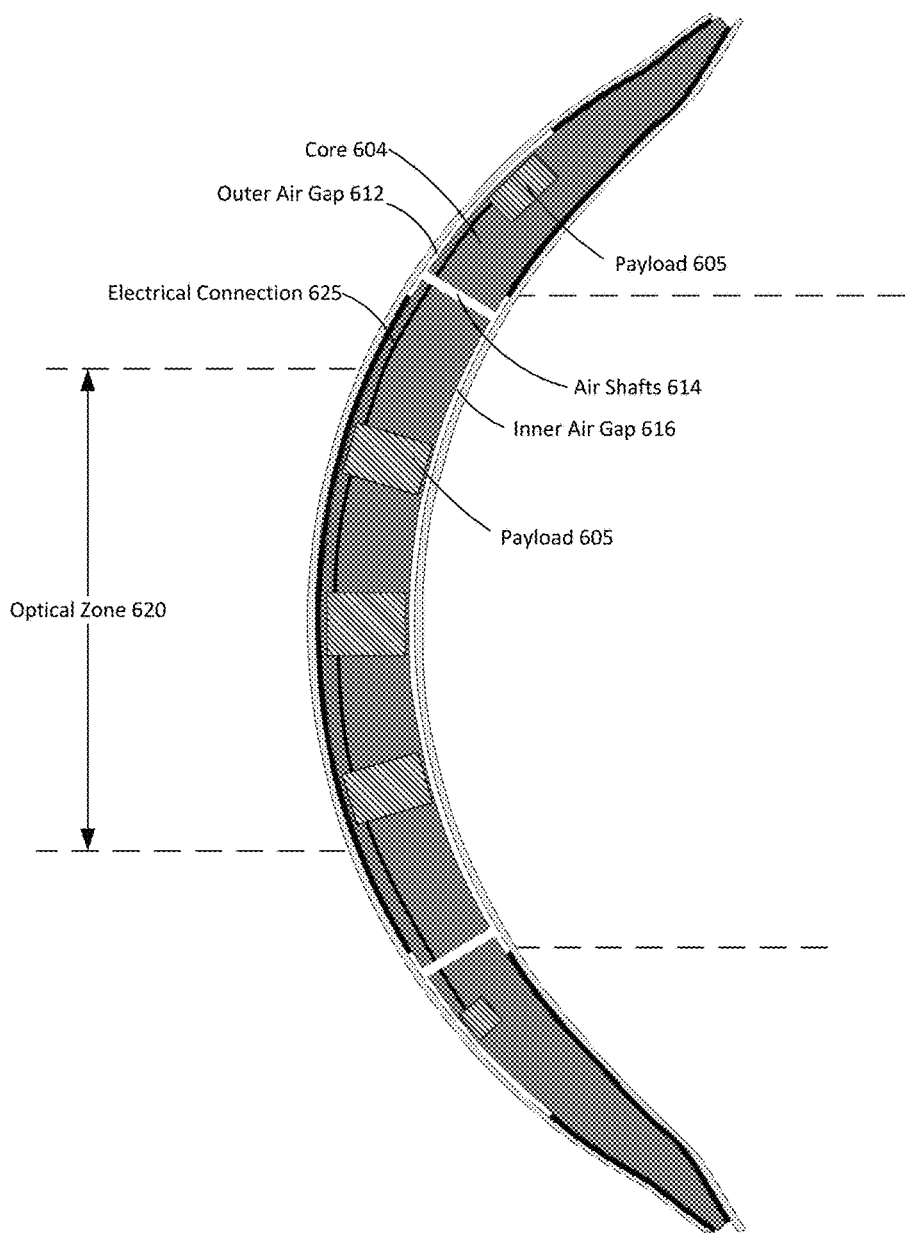
FIG. 6 is a cross sectional view of a dual-gap contact lens structure with multiple active payloads.

FIG. 6 is a cross sectional view of a dual-gap contact lens structure with multiple payloads. The contact lens structure 600 of FIG. 6 is similar to the contact lens structure 250 of FIG. 2B in that the outer air gap does not extend into the optical zone 620. The contact lens structure 600 includes a core 604 with air shafts 614 connecting an outer air gap 612 to an inner air gap 616 disposed over the wearer's cornea. The core 604 contains multiple payloads 605, some of which contain active electronics. Electrical connections 625 provide power and/or data connections between payloads 605.

In this example, some of the payloads 605 are outside the optical zone 620 and some are within the optical zone. In addition, some of the payloads 605 are outside the air shafts 614 and some are inside the air shafts. That is, there are payloads are laterally located on both sides of the air shafts 614 which go through the core 604. For example, the payloads 605 within the optical zone 620 may include femtoprojector(s) that project images onto the retina, while the payloads outside the optical zone may include electrical components that do not need to be within the optical zone, such as a processor or controller chip, an antenna, or a power coil. In this example, an antenna wirelessly receives instructions and/or image data from an external source, a controller chip processes and transmits image data and instructions to the femtoprojector(s) via the electrical connections 625, and a power coil receives power wirelessly from an external source and provides power to the femtoprojector(s) via the electrical connections 625.

The electrical connections 625 connect the electronic components of the payloads and may be wires or conductive traces. The electrical connections 625 are routed to go around the air shafts 614. For example, the electrical connections 625 may be routed between adjacent air shafts 614, similar to the electrical connection 325 illustrated in FIG. 3. In some embodiments, where the outer air gap of the contact lens structure is separated into different portions (e.g., as illustrated in FIG. 4B), the electrical connections 625 are routed under a glue layer (e.g., under the spokes 470) between different portions of the outer air gap in order to avoid exposure to air within the outer air gap.

In some applications, the core 604 is designed with an oxygen impermeable structural framework that provides mechanical support for the payloads 605. The payloads 605 with electrical components are inserted into the structural framework through the outer surface of the framework (i.e., the external-facing side of the framework) rather than through the inner surface (i.e., the eye-facing side). The electrical connections 625 are routed through the core 604 on the outer surface of the core. Recesses, holes, channels or other types of guide elements may be formed on the surface of the core 604 or in the core to facilitate placement and alignment of the payload 605 and routing of the electrical connections 625. The outer layer of the contact lens, which overlays the core 604, can be used to encapsulate the electrical components and electrical connections.

Figure 7:
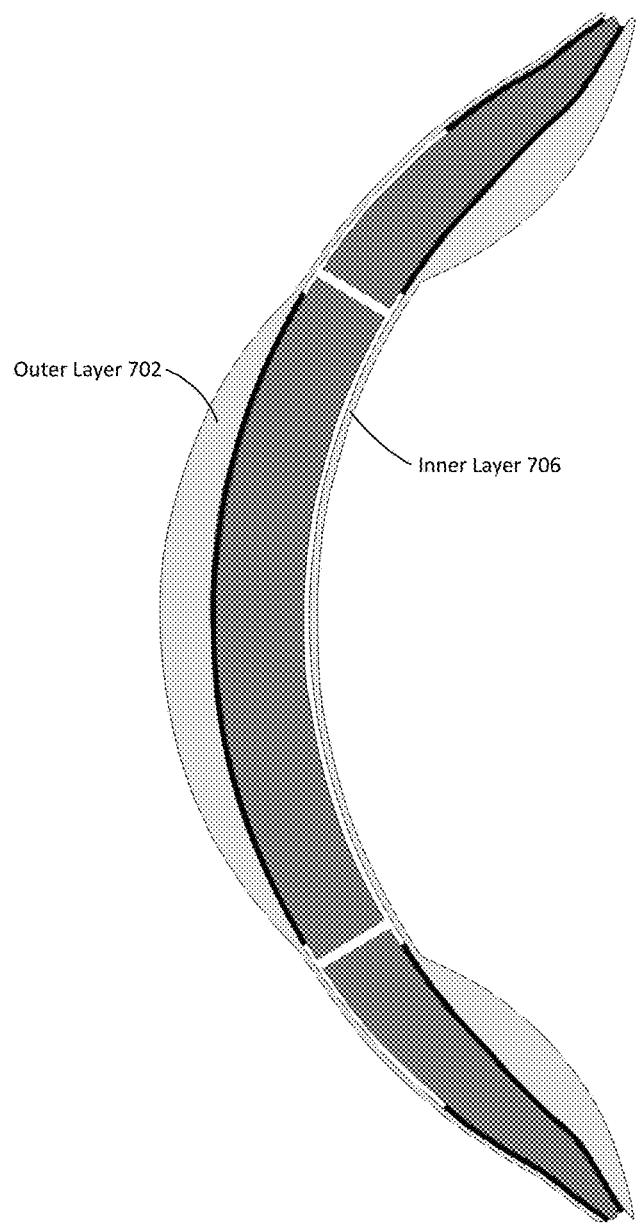
FIG. 7 is a cross sectional view of a dual-gap contact lens structure having increased thickness of the outer and inner layers in the glue zones.

While the figures discussed above illustrate the outer and inner layers of the contact lens stricture as having a constant thickness, in some embodiments the thickness may vary. FIG. 7 is a cross sectional view of a dual-gap contact lens structure where the outer layer 702 and the inner layer 706 are thicker over the glue zones. This may be used for customization of the contact lens for individual wearers. For example, the shape of the outer layer 702 over the optical zone may be customized to provide a desired amount of refractive correction for the wearer, while the shape of the inner layer 706 over the scleral areas of the contact lens may be customized to fit the physical shape of the wearer's eyeball. In some embodiments, any interfaces within the lens structure 700 between materials having different indices of refractive may be used to provide refractive correction for the wearer. The shape of the outer and inner layers may be modified by precision machining on a diamond lathe.

Figure 8:
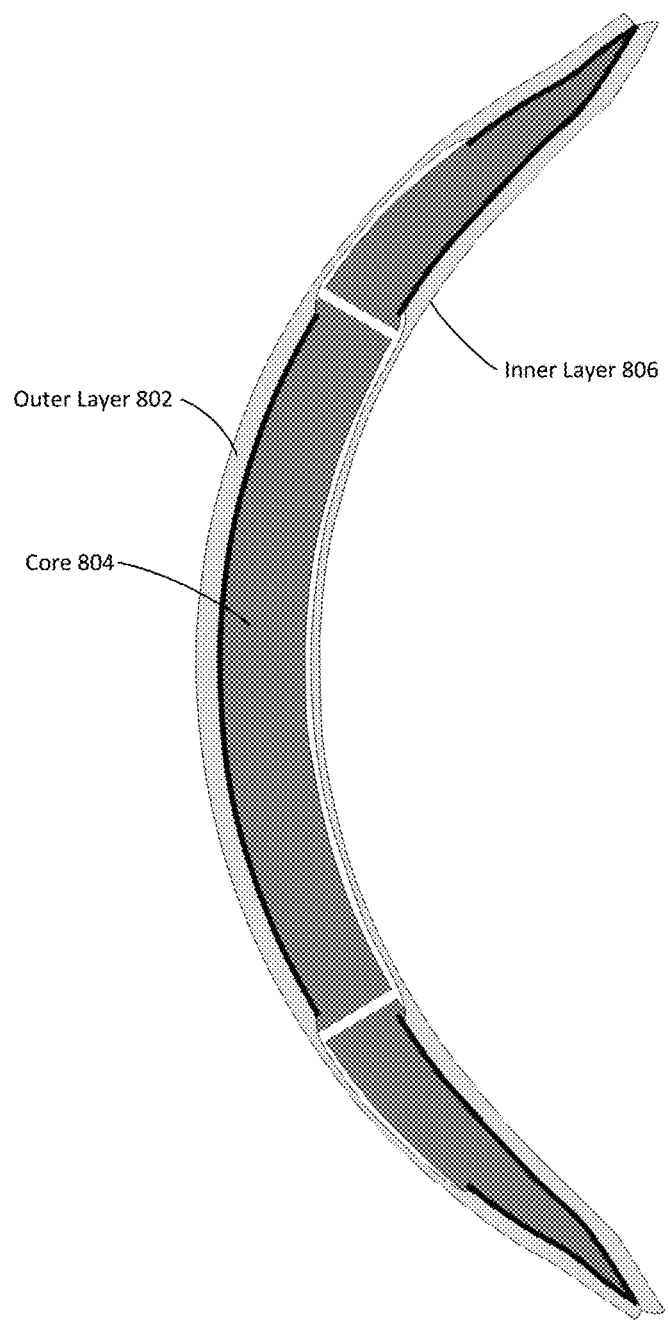
FIG. 8 is a cross sectional view of a dual-gap contact lens structure having reduced core thickness in the glue zones.

The core of the contact lens structure may also have a non-uniform thickness profile. FIG. 8 is a cross sectional view of a dual-gap contact lens structure having increased outer/inner layer thickness and reduced core thickness in glue zones. The increased thickness of the outer/inner layers of the contact lens structure 800 illustrated in FIG. 8 may increase a level of rigidity of the outer layer 802 and inner layer 806, while the core 804 is reduced in thickness to achieve a desired overall thickness profile for the contact lens structure.

Figure 9:
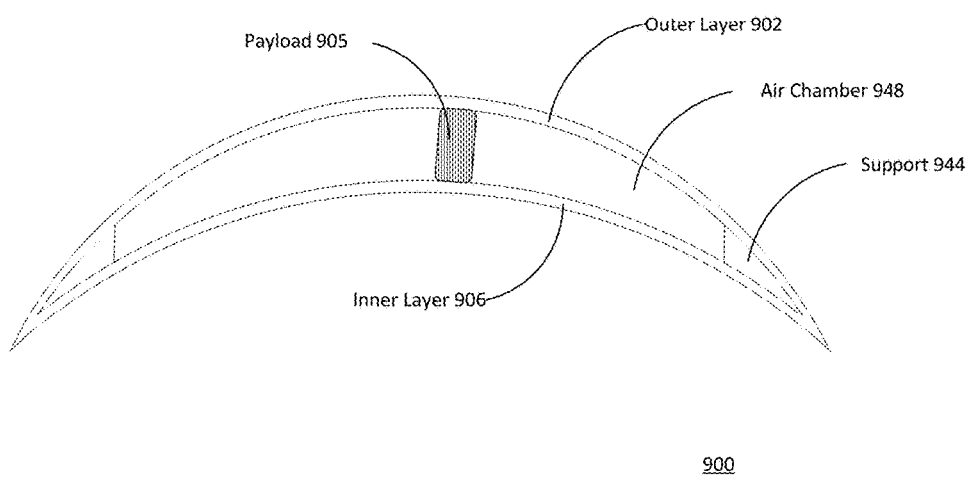
FIG. 9 is a cross sectional view of another contact lens structure.

FIG. 9 is a cross sectional view of another contact lens structure. In the contact lens structure 900 of FIG. 9, a support structure 944 in the form of a ring of material is located at the periphery of the contact lens structure between the outer layer 902 and the inner layer 906. The payload 905 is carried in a self-supporting column or similar structure that spans the space between outer layer 902 and inner layer 906. Only one column is shown but there may be additional supports, either with or without payloads. The remaining space is an air chamber 948 that allows oxygen transport from the outer layer 902 to the inner layer 906.

Figure 10:
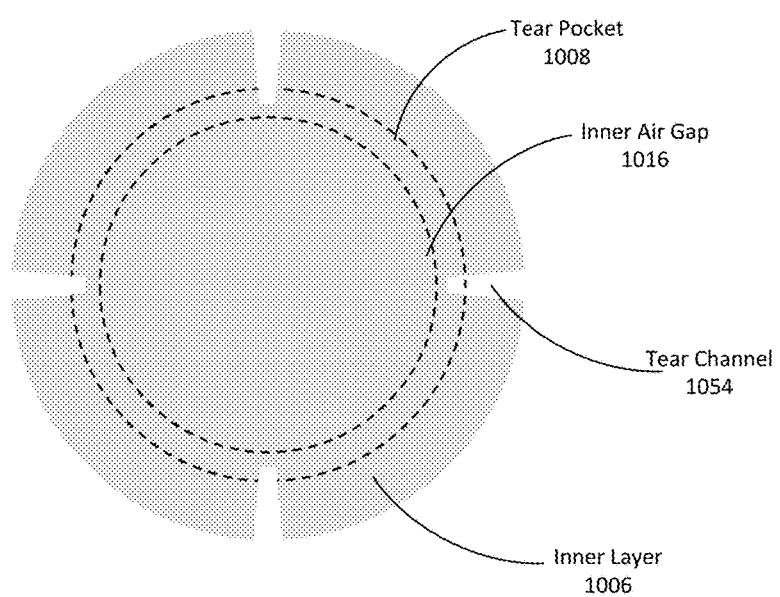
FIG. 10 is a plan view of an inner layer of a contact lens structure with tear channels.

In another aspect, a contact lens structure may include tear channels to facilitate the flow of tear fluid into and out of the tear pocket between the contact lens structure and the eye. FIG. 10 is a plan view of an inner layer of a contact lens structure with tear channels that facilitate circulation. The inner layer 1006 of the contact lens structure 1000 contains tear channels 1054, such as grooves or channels formed on the inner surface of the inner layer 1006. The tear channels 1054 may have a depth less than the thickness of the inner layer 1006 or they may extend through the entire thickness of the inner layer. In this example, the tear channels 1054 extend far enough into the contact lens structure to reach the tear pocket 1008 thus allowing tear fluid outside the contact lens to circulate into the tear pocket, but not far enough to reach the inner air gap 1016 thus preventing tear fluid from contaminating the air gap. In some applications, tear fluid may be channeled through the tear channel 1054 into the core or into payloads. For example, if the active payload is a glucose sensor, it may contact the tear fluid in order to obtain sensor readings.

Figure 11:
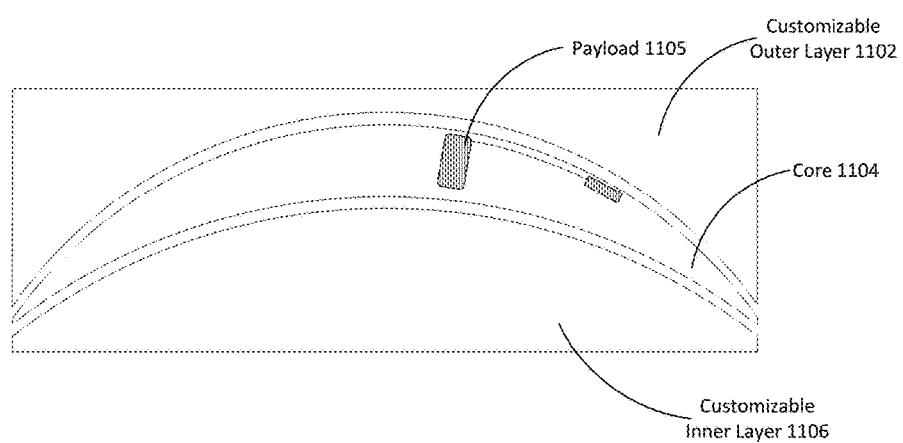
FIG. 11 is a cross sectional view of a scleral contact lens structure during lens manufacture.

The contact lens structures described above may be customized for individual wearers. FIG. 11 is a cross sectional view of a scleral contact lens structure during manufacture. Contact lens structures may contain features that are common to all wearers and also features that are custom each individual wearer. The custom features typically include the shape of the outer surface, for example to provide the appropriate amount of refractive correction to the wearer, and the shape of the inner surface, for example so that the contact lens fits correctly on the wearer's eye. The common features typically include the payloads that provide the device functionality. In this case, the core 1104 containing the payload(s) 1105 is a generic component that is the same for a large segment of the population. The outer and inner layers 1102 and 1106 are customizable. The outer layer 1102 may be shaped (e.g. with a lathe) to provide refractive correction for the wearer, while the inner layer 1106 may be shaped to fit the wearer's eyeball. The outer layer 1102, core 1104 and inner layer 1106 may be assembled by bonding, either before or after customization. In addition, the edges (periphery) of the contact lens structure may be thinned and rounded to enhance comfort for the wearer. In other embodiments, the inner layer 1106 may be shaped both to provide refractive correction for the wearer and to fit the wearer's eyeball, allowing for the outer layer 1102 to be manufactured as a generic component with the core 1104.

For example, the production and customization of a contact lens structure may involve a manufacturer(s), a contact lens lab, and a local retailer. The manufacturers produces "precursors" or "blanks". These precursors or blanks are partially manufactured contact lens structures and preferably already include as many of the common features as is commercially feasible such as the generic core, but they have not yet been customized for a specific wearer.

The wearer orders his contact lens structure through the retailer, for example in conjunction with a visit to an eye care professional (ophthalmologist, optometrist, optician). However, the same final contact lens product cannot be used for all individuals. Typically, the contact lens product is customized both based on the shape of the wearer's eyeball and to provide the refractive correction, if any, appropriate for the wearer.

The retailer obtains from the wearer information that specifies the wearer's customizations. Customization of the precursors/blanks is performed by the contact lens lab. The lab obtains precursors from the manufacturer. The lab also receives orders from the retailer. Based on the information provided by the retailer, the lab processes each contact lens precursor into a contact lens structure customized for a specific user. The customized contact lens structure is shipped to the retailer, who provides it to the wearer.

The foregoing description of the embodiments of the invention has been presented for the purpose of illustration; it is not intended to be exhaustive or to limit the invention to the precise forms disclosed, but merely illustrates different examples. It should be appreciated that the scope of the disclosure includes other embodiments not discussed in detail above. Persons skilled in the relevant art can appreciate that many modifications and variations are possible in light of the above disclosure, without departing from the spirit and scope as defined in the appended claims. Therefore, the scope of the invention should be determined by the appended claims and their legal equivalents.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A contact lens structure to be disposed on an eye, comprising:
    an electronics core containing electronic devices, the electronics core laterally overlapping a cornea of the eye, where oxygen flow through the electronics core is not sufficient to oxygenate the cornea;
    an oxygen collection strata comprising (a) a gas-permeable outer layer and (b) a collection underlayer, the gas-permeable outer layer exposed to ambient oxygen;
    an oxygen distribution stratum disposed between the electronics core and the cornea, the oxygen distribution stratum comprising (x) a gas-permeable inner layer disposed over the cornea and (y) a distribution overlayer; and a network of oxygen channels from the collection underlayer of the oxygen collection stratum to the distribution overlayer of the oxygen distribution stratum, the collection underlayer transporting oxygen from the gas-permeable outer layer to the network of oxygen channels and the distribution overlayer transporting oxygen from the network of oxygen channels to the gas-permeable inner layer, where at least some of the oxygen channels traverse through the electronics core.

2. The contact lens structure of claim 1, where the electronics core comprises:

a gas-impermeable material that provides a structural framework for the electronics core; and one or more payloads of electronic devices inserted into the structural framework.

3. The contact lens structure of claim 1, where the electronic devices comprises a femtoprojector.

4. The contact lens structure of claim 1, where the electronics core further comprises at least one of:

a coil electrically connected to the electronic devices, the coil wirelessly receiving power and providing the power to the electronic devices, or an antenna electrically connected to the electronic devices, the antenna wirelessly receiving data and providing the data to the electronic devices.

5. The contract lens structure of claim 1, where the oxygen collection stratum laterally overlaps the cornea, the electronics core sandwiched between the oxygen collection stratum and the oxygen distribution stratum.

6. The contact lens structure of claim 5, where the electronics core comprises:

a gas-impermeable material that provides a structural framework for the electronics core;

one or more payloads of electronic devices inserted into the structural framework through apertures in an outer surface of the structural framework; and electrical connections to the electronic devices, the electrical connections on an outer surface of the electronics core, the oxygen collection stratum providing encapsulation for the electrical connections.

7. The contact lens structure of claim 5, where the oxygen collection stratum provides encapsulation for the electronic devices.

8. The contact lens structure of claim 1, where at least one of the collection underlayer and the distribution overlayer comprises an air gap.

9. The contact lens structure of claim 1, where at least one of the collection underlayer and the distribution overlayer comprises a matrix of grooves.

10. The contact lens structure of claim 1, where each of the gas-permeable outer layer and the gas-permeable inner layer vary in thickness across the contact lens structure.

11. The contact lens structure of claim 1, where the electronics core contains electrical components, the electrical components laterally located on both sides of oxygen channels traversing through the electronics core.

12. The contact lens structure of claim 1, where the oxygen channels are substantially vertical channels.

13. The contact lens structure of claim 1, where all of the oxygen channels are located outside an optical zone of the contact lens structure.

14. The contact lens structure of claim 13, where the collection underlayer and distribution overlayer laterally overlap only outside an optical zone of the contact lens structure.

15. The contact lens structure of claim 1, where at least some of the oxygen channels are located within an optical zone of the contact lens structure.

16. The contact lens structure of claim 1, where the gas-permeable outer layer, electronics core, and gas-permeable inner layer are glued together outside an optical zone of the contact lens structure.

17. The contact lens structure of claim 1, where the contact lens structure forms a tear pocket over the cornea when the contact lens structure is disposed on the eye, the contact lens structure further comprising:

a tear channel that facilitates a flow of tear fluid into and out of the tear pocket.

18. The contact lens structure of claim 1, further comprising an anti-reflection coating at an interface between the electronics core and at least one of the collection underlayer and the distribution overlayer.

19. The contact lens structure of claim 1, where the electronics core and oxygen collection stratum are not customized for individuals, and the oxygen distribution stratum is customized for individuals.

20. A contact lens structure to be disposed on an eye, comprising:

a core laterally overlapping a cornea of the eye, where oxygen flow through the core is not sufficient to oxygenate the cornea;

an oxygen collection stratum comprising (a) a gas-permeable outer layer and (b) a collection underlayer, the gas-permeable outer layer exposed to ambient oxygen;

an oxygen distribution stratum disposed between the core and the cornea, the oxygen distribution stratum comprising (x) a gas-permeable inner layer disposed over the cornea and (y) a distribution overlayer; and a network of oxygen channels from the collection underlayer of the oxygen collection stratum to the distribution overlayer of the oxygen distribution stratum, the collection underlayer transporting oxygen from the gas-permeable outer layer to the network of oxygen channels and the distribution overlayer transporting oxygen from the network of oxygen channels to the gas-permeable inner layer, where at least some of the oxygen channels traverse through the core.

* * * * *